United States Patent
Xu et al.

(10) Patent No.: US 9,481,072 B2
(45) Date of Patent: Nov. 1, 2016

(54) SANDING ELEMENTS REPLACING DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Dian-Xu Xu, Shenzhen (CN); Jun-Jie Han, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 21 days.

(21) Appl. No.: 14/688,855

(22) Filed: Apr. 16, 2015

(65) Prior Publication Data

US 2016/0151882 A1  Jun. 2, 2016

(30) Foreign Application Priority Data

Nov. 28, 2014 (CN) .......................... 2014 1 0701673

(51) Int. Cl.
*B24B 7/22* (2006.01)
*B24D 9/08* (2006.01)
*B24B 57/04* (2006.01)
*B23Q 3/155* (2006.01)

(52) U.S. Cl.
CPC .............. *B24B 57/04* (2013.01); *B23Q 3/155* (2013.01)

(58) Field of Classification Search
CPC ....... B24D 9/085; B24B 23/005; B24B 7/24; B24B 23/02; B24B 37/26
USPC ....................................... 451/5, 8, 9, 10, 485
See application file for complete search history.

(56) References Cited

U.S. PATENT DOCUMENTS

| | | | | |
|---|---|---|---|---|
| 4,712,289 A | * | 12/1987 | Stamm .................. | B24D 9/085 451/342 |
| 6,379,221 B1 | * | 4/2002 | Kennedy ................ | B24B 37/12 414/226.02 |
| 6,520,895 B2 | * | 2/2003 | Senga ..................... | B24B 37/20 451/342 |
| 6,527,621 B1 | * | 3/2003 | Halley .................... | B24B 37/26 451/5 |

* cited by examiner

*Primary Examiner* — Robert Rose
(74) *Attorney, Agent, or Firm* — Zhigang Ma

(57) ABSTRACT

A device for replacing sanding elements of a polishing device includes a first support, a second support, a feeder assembly, a suction assembly, a first pushing assembly, a second pushing assembly, and a clamping assembly. The feeder assembly includes a receiving member configured to receive the sanding elements, and a supporting member positioned below the receiving member. The suction assembly includes a suction member configured to draw a sanding element from the receiving member, and a rotary actuator configured to rotate the suction member. The first pushing assembly is configured to receive the sanding element from the suction member and transport the sanding element to the polishing device. The clamping assembly is configured to attach an unused sanding element to, and detach a used sanding element from, a manipulator of the polishing device, and the second pushing assembly is configured to separate the sanding element from the clamping assembly.

12 Claims, 4 Drawing Sheets

SANDING ELEMENTS REPLACING DEVICE

FIELD

The subject matter herein generally relates to a sanding elements replacing device, and particularly to a sanding elements replacing device of an automatic polishing line.

BACKGROUND

Surface robots equipped with polishing tools or devices are used for smoothing out of the workpiece surfaces. The sandpapers that are used during the polishing process need to be replaced after a certain usage time to ensure polishing quality. The used sandpapers are usually manually removed from the polishing devices, and then new sandpapers are supplied and attached or mounted on the polishing devices.

BRIEF DESCRIPTION OF THE DRAWINGS

Implementations of the present technology will now be described, by way of example only, with reference to the attached figures.

DETAILED DESCRIPTION

Figure 1:
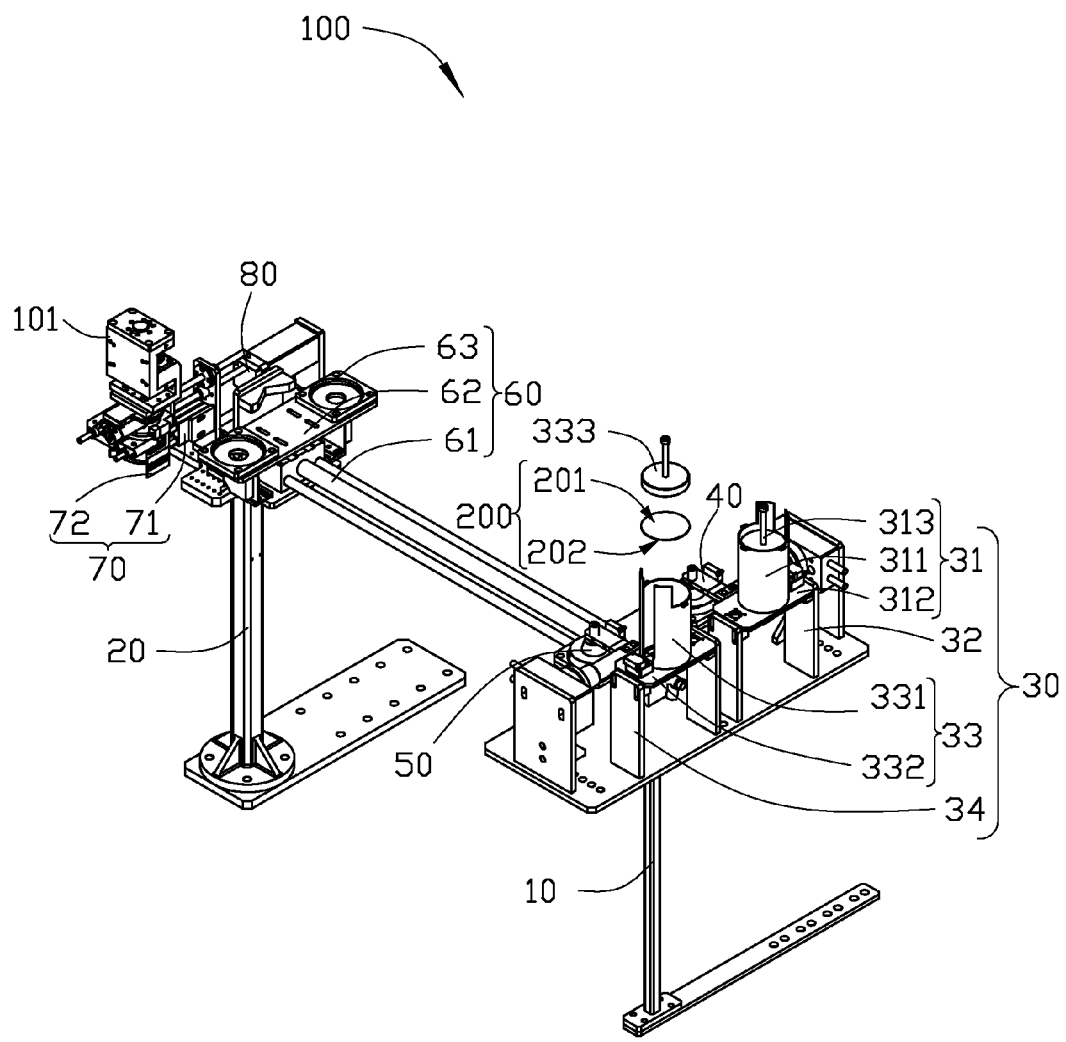
FIG. 1 is an isometric view of an embodiment of a sanding elements replacing device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is relation to a device for robotically replacing replaceable sanding elements of a robot equipped with a polishing device.

FIG. 1 illustrates that a sanding elements replacing device 100 can include a first support 10, a second support 20 distanced from the first support 10, a feeder assembly 30, a first suction assembly 40, a second suction assembly 50, a first pushing assembly 60, a clamping assembly 70, and a second pushing assembly 80. The feeder assembly 30, the first suction assembly 40, and the second suction assembly 50 can be supported by the first support 10. The clamping assembly 70 and the second pushing assembly 80 can be supported by the second support 20. The first pushing assembly 60 can be mounted across the first support 10 and the second support 20.

In at least one embodiment, a plurality of sandpapers 200 can be received in the feeder assembly 30, and the first suction assembly 40 and the second suction assembly 50 can be configured to suck the sandpapers 200 from a bottom portion of the feeding assembly 30. In other embodiments, the sandpaper 200 can be other sanding elements.

The polishing device (not shown) can include a manipulator 101 (FIG. 1 only showing a part of the manipulator 101). The first pushing assembly 60 can be configured to receive the sandpaper 200 from the first suction assembly 40 and the second suction assembly 50 and transport the sandpapers 200 to the manipulator 101 of the polishing device for polishing workpieces. After polishing the workpiece, the manipulator 101 can move back to the clamping assembly 70. The clamping assembly 70 can attach an unused sanding element to, and detach an used sanding element from, the manipulator 101 of the polishing device. The second pushing assembly 80 can push the sandpaper 200 to drop off the clamping assembly 70 when the clamping for the sandpaper 200 is released.

In at least one embodiment, one end of the first pushing assembly 60 mounted on the first support 10 can be adjacent to the feeder assembly 30, the first suction assembly 40, and the second suction assembly 50, and the other end of the first pushing assembly mounted on the second support 20 can be adjacent to the second pushing assembly 80 and the clamping assembly 70. In other embodiments, the first support 10 and the second support 20 can be replaced by one bracket to support the pushing assembly 60.

The sandpaper 200 can include a first surface 201 and a second surface 202 opposite the first surface 201. In at least one embodiment, the first surface 201 can be rougher the second surface 202. When the sandpaper 200 is received in the feeder assembly 30, the second surface 202 of the sandpaper 200 can be positioned toward the first support 10, such that the second surface 202 can be sucked by the first suction assembly 40 or the second suction assembly 50.

The feeder assembly 30 can include a first receiving member 31, a first supporting member 32 fixedly connected to the first support 10, a second receiving member 33, and a second supporting member 34 fixedly connected to the first support 10. The first supporting member 32 can be used to support the first receiving member 31, and the second supporting member 34 can be used to support the second receiving member 33.

The first receiving member 31 can include a first receiving portion 311, a first connecting portion 312, and a first pressing block 313. The first receiving portion 311 can be substantially hollow cylinder shaped. The first connecting portion 312 can be substantially perpendicular to the first receiving portion, and the first pressing block 313 can be positioned in the first receiving portion 311.

The second receiving portion 33 can be same with the first receiving member 31 and can include a second receiving portion 331, a second connecting portion 332 connected to the second receiving portion 331, and a second pressing block 333 positioned in the second receiving portion 331.

The first pushing assembly 60 can have a first end connected to the first support 10 and a second end connected to the second support 20. The first pushing assembly 60 can include a first driver 61, a supporting plate 62 connected to the first driver 61, and two trays 63 mounted on the supporting plate 62. In at least one embodiment, the first driver 61 can be a rodless cylinder. Two ends of the first driver 61 can be connected to the first support 10 and the second support 20. The first driver 61 can drive the supporting plate 62 move away or toward the first suction assembly 40 and the second suction assembly 50.

The first suction assembly 40 and the second suction assembly 50 can be mounted at two opposite sides of the first support 10. The first suction assembly 40 can be positioned near the first receiving member 31, and the second suction assembly can be positioned near the second receiving member 33. The supporting plate 62 and the trays 63 can move between the first support 10 and the second support 20 for transporting the sandpapers 200.

Figure 2:
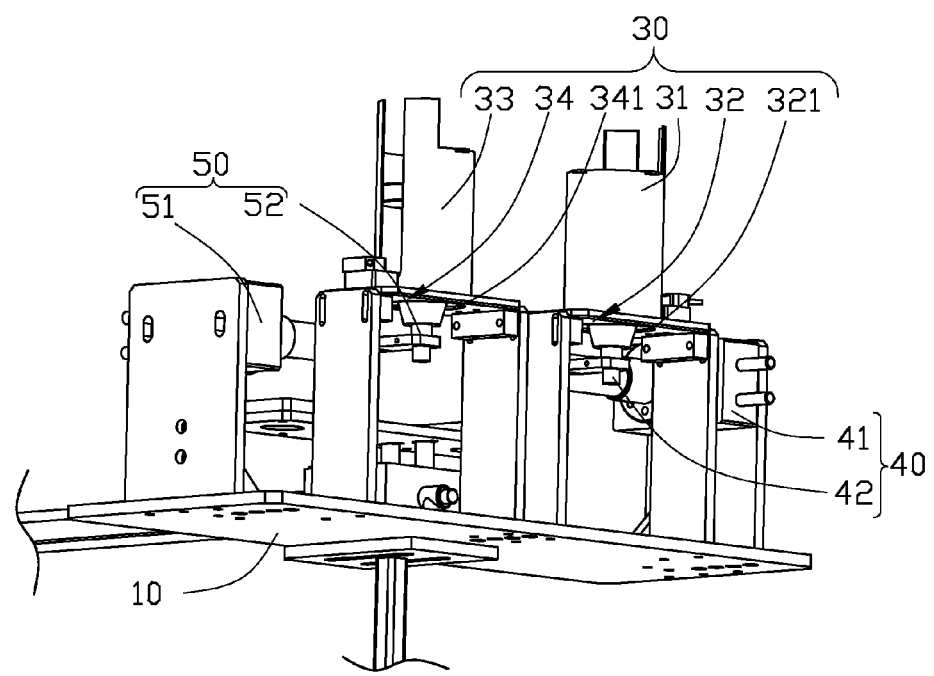
FIG. 2 is an isometric view of a feeding assembly, a first suction assembly, and a second suction assembly of the sanding elements replacing device shown in FIG. 1.

FIG. 2 illustrates that the first supporting member 32 can define a first through hole 321 communicated with the first receiving portion 311, and a diameter of the first through hole 321 can be smaller than a diameter of the first receiving portion 311. The second supporting member 34 can define a second through hole 341 communicated with the second receiving portion 331, and a diameter of the second through hole 341 can be smaller than a diameter of the second receiving portion 331.

The first suction assembly 40 can include a first rotary actuator 41 and a first suction member 42 connected to the first rotary actuator 41. The first rotary actuator 41 can be configured to drive the first suction member 42 to rotate. The sandpaper 200 can move along the first pushing assembly 60 when being transported from the suction member 42 to the polishing device.

The second suction assembly 50 can include a second rotary actuator 51 and a second suction member 52 connected to the second rotary actuator 51. The second rotary actuator 51 can be configured to drive the second suction member 52 to rotate 180 degrees for sucking the sandpaper 200 from a bottom portion of the second receiving member 331.

In at least one embodiment, the first rotary actuator 41 and the second rotary actuator 51 can be rotary cylinders, and the first suction member 42 and the second suction member 52 can be suckers.

The first pressing block 313 and the second pressing block 333 can press the sandpapers 200 received in the first receiving portion 311 and the second receiving portion 331, to keep the sandpapers 200 flat.

The diameter of the first through hole 321 can be smaller than the first receiving portion 311, and the diameter of the second through hole 341 can be smaller than the second receiving portion 331. Furthermore, the first suction member 42 and the second suction member 52 can draw the sandpapers 200 from the first receiving portion 31 and the second receiving portion 33, so the sandpapers 200 can fall under the action of gravity. The first suction member 42 and second suction member 52 can draw one piece of the sandpaper 200 every time, and the sandpapers 200 would not bond.

Figure 3:
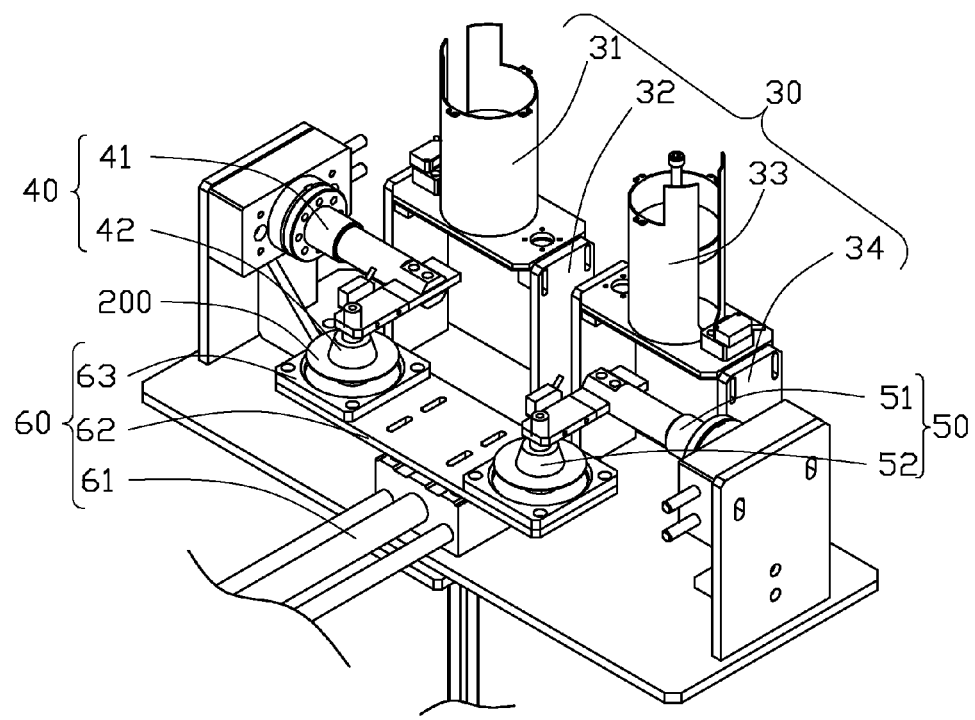
FIG. 3 is an isometric view of the feeding assembly, the first suction assembly, and the second suction assembly shown in FIG. 1 viewed from another angle.

FIG. 3 illustrates that the two trays 63 can be positioned corresponding to the first suction member 42 and the second suction member 52, and used to take the sandpapers 200 from the first suction member 42 and the second suction member 52.

In at least one embodiment, the first suction member 42 can be positioned at a first position below the first receiving member 31 for sucking the sandpaper 200 in the first receiving member 31. After the first suction member 42 rotated 180 degrees driven by the first rotary actuator 41, the first suction member 42 can be positioned at a second position above the first pushing assembly 60 for releasing the sandpaper 200. The second suction member 52 can be configured to rotate 180 degrees to draw the sandpaper 200 from the second receiving member 33.

In other embodiments, the feeder assembly 30 can include at least one receiving member, and the first suction assembly 40, the second suction assembly 50, and the tray 63 can be at least one.

Figure 4:
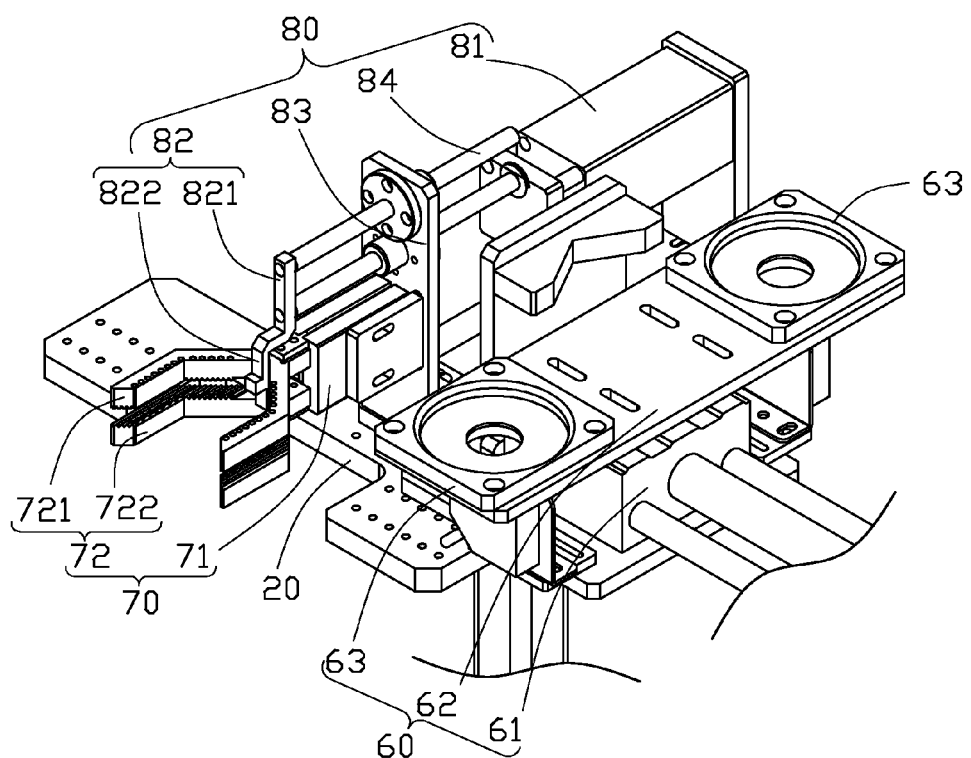
FIG. 4 is an isometric view of a clamping assembly, a first pushing assembly, and a second pushing assembly of the sanding elements replacing device shown in FIG. 1.

FIG. 4 illustrates that the clamping assembly 70 can include a clamping driver 71 and a clamping subassembly 72. The clamping driver 71 can be an air cylinder or a motor and used to drive the clamping subassembly 72. The clamping subassembly 72 can include a first clamping jaw 721 and a second clamping jaw 722 parallel to and opposite the first clamping jaw 721. The first clamping jaw 721 and the second jaw 722 can be pentagonal. The clamping assembly 70 can clamp the sandpaper 200 more stably than a conventional clamping assembly with linear clamping jaws.

The second pushing assembly 80 can include a second pushing driver 81, a pushing pawl 82 connected to the second pushing driver 81, a support 83 mounted on the second support 20, and a guiding rod 84 mounted on the support 83. The second pushing assembly 80 can be configured to separate a used sanding element from the clamping assembly 70.

The pushing pawl 82 can be substantially Z-shaped and include a fixing portion 821 and a pushing portion 822. The fixing portion 821 can be perpendicularly connected to the second pushing driver 81, and the pushing portion 822 can be L-shaped and connected to the fixing portion 821. One end of the pushing portion 822 away from the fixing portion 821 can be perpendicular to the first clamping jaws 721 and the second clamping jaw 722. The pushing portion 822 can extend to the clamping assembly 70 for pushing the sandpaper 200 out of the first clamping jaw 721 and the second clamping jaw 722. The support 83 can be perpendicular to the guiding rod 84 and connected to the second support 20. The guiding rod 84 can move relative to the stand 83 along with the second pushing driver 81, thus the guiding rod 84 can move toward or away from the pushing pawl 82.

In use, a plurality of the sandpapers 200 can be positioned in the first receiving portion 311 and the second receiving portion 331, and the second surfaces 202 of the sandpapers 200 can be positioned toward the first support 10. The first pressing block 313 and the second block 333 can be positioned above the sandpapers 200 in the first receiving portion 311 and the second receiving portion 331. The first rotary actuator 41 and the second rotary actuator 51 can drive the first suction member 42 and the second suction member 52 rotate 180 degrees to suck the sandpapers 200.

After the sandpapers 200 are sucked by the first suction member 42 and the second suction member 52, the first rotary actuator 41 and the second rotary actuator 51 can drive the first suction member 42 and the second suction member to rotate 180 degrees along a reverse direction. The first driver 61 can drive the supporting plate 62 and the trays 63 move toward the first suction member 42 and the second suction member 52, and then the first suction member 42 and the second suction member 52 release the sandpapers 200 to the trays 63. Then, the first driver 61 can drive the supporting plate 62 and the trays 63 move away from the first suction member 42 and the second suction member 52 and move toward the manipulator 101. The manipulator 101 can take the sandpapers 200 for polishing the workpieces.

After the polishing device polished the workpieces, the sandpaper 200 after being used needs to be replaced. The manipulator 101 can move to the clamping assembly 70, and the first clamping jaw 721 and the second clamping jaw 722 can tightly clamp the sandpaper 200. Then the manipulator 101 can move away from the clamping assembly 70. The clamping assembly 70 can then release the sandpaper 200, and the second pushing driver 81 can drive the pushing pawl 82 to push the sandpaper 200, thus the sandpaper 200 can drop off the clamping assembly 70. Therefore, the sanding elements replacing device 100 with a simple structure can automatically replace the sandpapers 200. Moreover, the efficiency of replacing the sandpapers 200 will be improved. Time and labor The embodiments shown and described above are only examples. Many details are often found in the art such as the other features of a sanding elements replacing device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, comprising in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A device for robotically replacing replaceable sanding elements of a polishing device, the device comprising:
    a first support;
    a second support;
    a feeder assembly supported by the first support and having a supporting member positioned on the first support and a receiving member supported by the supporting member, the receiving member configured to receive unused sanding elements;
    a suction assembly supported by the first support having a suction member configured to draw a sanding element from the receiving member and a rotary actuator configured to rotate the suction member;
    a first pushing assembly with a first end connected to the first support and a second end connected to the second support, the first pushing assembly being configured to receive the sanding element from the suction member and transport the sanding element to the polishing device;
    a clamping assembly supported by the second support and configured to attach an unused sanding element to, and detach a used sanding element from, a manipulator of the polishing device; and
    a second pushing assembly supported by the second support and configured to separate a used sanding element from the clamping assembly;
    wherein, the sanding element moves along the first pushing assembly when being transported from the suction member to the polishing device.

2. The device as claimed in claim 1, wherein the receiving member comprises a hollow receiving portion and a connecting portion connected to the receiving portion, and the supporting member is connected to the connecting portion.

3. The device as claimed in claim 1,
    wherein the clamping assembly comprises a clamping driver and a clamping subassembly connected to the clamping driver; and
    wherein the clamping subassembly comprises a first clamping jaw and a second clamping jaw parallel to and opposite the first clamping jaw, and the first clamping jaw and the second clamping jaw are pentagonal.

4. The device as claimed in claim 1, wherein the rotary actuator is a rotary cylinder, and the suction member is a sucker.

5. The device as claimed in claim 1, wherein the first pushing assembly comprises a first pushing driver, and the second pushing assembly comprises a second pushing driver adjacent to the first pushing driver.

6. The device as claimed in claim 5, wherein the first pushing assembly further comprises a supporting plate connected to the first pushing driver, and at least one tray mounted on the supporting plate.

7. The device as claimed in claim 6, wherein the second pushing assembly further comprises a pushing pawl, and the pushing pawl comprises a fixing portion perpendicularly connected to the second pushing driver and a pushing portion connected to the fixing portion.

8. The device as claimed in claim 7, wherein one end of the pushing portion away from the fixing portion is perpendicular to the clamping assembly and extends to the clamping assembly for pushing the sanding element out of the clamping assembly.

9. The device as claimed in claim 1,
    wherein the bracket comprises a first support and a second support, and the first pushing assembly is mounted across the first support and the second support; and
    wherein one end of the first pushing assembly mounted on the first support is adjacent to the feeder assembly and the suction assembly, and the other end of the first pushing assembly mounted on the second support is adjacent to the second pushing assembly and the clamping assembly.

10. The device as claimed in claim 1, wherein the supporting member defines a through hole communicated to the receiving portion, and a diameter of the through hole is smaller than a diameter of the receiving portion.

11. The device as claimed in claim 1, wherein the feeder assembly comprises two receiving members, and the suction assemblies are two; the two suction assemblies are positioned corresponding to the two receiving members.

12. The device as claimed in claim 1, wherein the suction member is further configured to rotate to a first position below the receiving member to suck the sanding element, and rotate to a second position above the first pushing assembly to release the sandpaper to the first pushing assembly.

* * * * *